US010760305B2

(12) United States Patent
Taylor et al.

(10) Patent No.: US 10,760,305 B2
(45) Date of Patent: Sep. 1, 2020

(54) SELF-LOCKING GUILLOTINE DOOR

(71) Applicant: The Mason Company, LLC, Leesburg, OH (US)

(72) Inventors: Gregory N Taylor, Cincinnati, OH (US); Gary Silvis, Sardinia, OH (US); Daniel L Perry, Lynchburg, OH (US); Troy N Brown, Washington Court House, OH (US)

(73) Assignee: Midmark Corporation, Versailles, OH (US)

( * ) Notice: Subject to any disclaimer, the term of this patent is extended or adjusted under 35 U.S.C. 154(b) by 381 days.

(21) Appl. No.: 15/644,041

(22) Filed: Jul. 7, 2017

(65) Prior Publication Data

US 2019/0010745 A1 Jan. 10, 2019

(51) Int. Cl.
| | |
|---|---|
| *E05B 65/08* | (2006.01) |
| *E05F 11/54* | (2006.01) |
| *E05C 9/02* | (2006.01) |
| *E05C 9/18* | (2006.01) |
| *E05C 19/00* | (2006.01) |
| *E05F 1/02* | (2006.01) |
| *A01K 1/03* | (2006.01) |

(52) U.S. Cl.
CPC ............ *E05B 65/0823* (2013.01); *E05C 9/02* (2013.01); *E05C 9/1825* (2013.01); *E05C 19/007* (2013.01); *E05F 1/025* (2013.01); *E05F 11/54* (2013.01); *A01K 1/034* (2013.01); *E05C 9/1875* (2013.01); *E05Y 2900/132* (2013.01)

(58) Field of Classification Search
CPC ..... A01K 1/034; E05F 11/54; E05B 65/0823; E05C 9/02; E05C 9/025; E05C 9/1825; E05C 9/1833; E05C 9/1841; A01M 23/20
See application file for complete search history.

(56) References Cited

U.S. PATENT DOCUMENTS

| | | | | |
|---|---|---|---|---|
| 1,743,247 | A * | 1/1930 | Stark ....................... | E05F 11/54 49/360 |
| 1,858,345 | A * | 5/1932 | Spindler ................. | E05F 11/00 292/98 |
| 1,888,612 | A * | 11/1932 | Anderson ................ | F23M 7/00 74/89.22 |
| 1,989,964 | A * | 2/1935 | Beckler ................. | E05F 11/483 74/89.22 |
| 2,012,336 | A * | 8/1935 | Blodgett ................. | E05D 15/24 160/9 |

(Continued)

*Primary Examiner* — Magdalena Topolski
*Assistant Examiner* — Morgan T Barlow
(74) *Attorney, Agent, or Firm* — Frost Brown Todd LLC

(57) ABSTRACT

The self-locking guillotine door assembly includes a door, a locking mechanism attached to the door, and a cable attached to the locking mechanism. Pulling the cable releases the locking mechanism and lifts the locking mechanism and door. Pushing up on the bottom of the door locks the locking mechanism and resists lifting the door. The locking mechanism can include a post, a vertical slide with a slot, connector bars and cams such that when the cable is pulled, the cable lifts the vertical slide to lift proximal ends of the connector bars, which pivots the cams to release the locking mechanism. When the enclosure door is pushed up from the bottom, the locking mechanism pivots the cams towards the top of the enclosure door to lock the locking mechanism and resist lifting of the enclosure door.

20 Claims, 5 Drawing Sheets

(56) References Cited

U.S. PATENT DOCUMENTS

| | | | | |
|---|---|---|---|---|
| 2,067,623 | A * | 1/1937 | Smith | E05F 1/02 |
| | | | | 49/390 |
| 2,527,511 | A * | 10/1950 | Sunday | A01M 23/20 |
| | | | | 43/61 |
| 2,742,280 | A * | 4/1956 | Wilcox | E05F 15/684 |
| | | | | 160/189 |
| 3,718,120 | A * | 2/1973 | Schwarz | A01K 1/034 |
| | | | | 119/421 |
| 4,322,913 | A * | 4/1982 | Himmer | E06B 7/32 |
| | | | | 49/168 |
| 4,760,872 | A * | 8/1988 | Hale, Jr. | E06B 7/32 |
| | | | | 160/180 |
| 4,956,938 | A * | 9/1990 | DeMent | E05D 13/003 |
| | | | | 160/193 |
| 5,469,659 | A * | 11/1995 | Reid | E05B 47/0038 |
| | | | | 160/180 |
| 5,634,298 | A * | 6/1997 | Slopack | E05F 15/75 |
| | | | | 49/360 |
| 5,778,594 | A * | 7/1998 | Askins | A01M 23/20 |
| | | | | 119/474 |
| 6,061,961 | A * | 5/2000 | Rupe | E05D 15/1042 |
| | | | | 49/147 |
| 6,481,156 | B1 | 11/2002 | Richmond | |
| 6,691,463 | B1 * | 2/2004 | Richmond | A01K 1/0017 |
| | | | | 119/484 |
| 6,959,511 | B2 * | 11/2005 | Johnson | E06B 7/32 |
| | | | | 160/180 |
| 6,966,147 | B2 * | 11/2005 | Solowiej | A01K 1/035 |
| | | | | 49/169 |
| 7,213,368 | B1 * | 5/2007 | Eliasen | A01K 15/02 |
| | | | | 119/454 |
| 7,284,502 | B1 * | 10/2007 | Dotter | E06B 7/32 |
| | | | | 119/484 |
| 7,500,452 | B2 * | 3/2009 | O'Connell | A01K 1/0023 |
| | | | | 119/840 |
| 7,737,860 | B2 * | 6/2010 | Banta | E06B 9/68 |
| | | | | 318/466 |
| 7,744,035 | B2 * | 6/2010 | Saint-Jalmes | B64D 11/003 |
| | | | | 244/118.5 |
| 7,784,430 | B1 * | 8/2010 | Thorne | E06B 7/32 |
| | | | | 119/484 |
| 7,854,088 | B2 * | 12/2010 | Kurachi | A01M 23/20 |
| | | | | 43/58 |
| 8,020,519 | B2 * | 9/2011 | Stamper | A01K 31/02 |
| | | | | 119/484 |
| 8,074,606 | B1 * | 12/2011 | Schrey | E06B 7/32 |
| | | | | 119/484 |
| 8,127,718 | B2 | 3/2012 | Hoegh et al. | |
| 8,302,348 | B2 * | 11/2012 | Noyes | E05F 15/649 |
| | | | | 119/484 |
| 8,375,646 | B2 * | 2/2013 | Newkirk | A61G 12/00 |
| | | | | 49/213 |
| 8,595,976 | B1 * | 12/2013 | Solowiej | E06B 7/32 |
| | | | | 49/169 |
| 8,915,216 | B2 | 12/2014 | Hoegh et al. | |
| 9,003,705 | B1 * | 4/2015 | Solowiej | E06B 7/32 |
| | | | | 49/169 |
| 9,284,773 | B1 * | 3/2016 | Fridley | E06B 7/32 |
| 9,896,245 | B1 * | 2/2018 | Sanchez | B65D 43/12 |
| 10,174,554 | B2 * | 1/2019 | Kuhnl-Kinel | E06B 11/025 |
| 2006/0053693 | A1 * | 3/2006 | Sullivan | E06B 7/32 |
| | | | | 49/168 |
| 2007/0234643 | A1 * | 10/2007 | Siegal | E05D 13/1284 |
| | | | | 49/360 |
| 2008/0264349 | A1 * | 10/2008 | Hoegh | A01K 1/0017 |
| | | | | 119/718 |
| 2009/0293340 | A1 * | 12/2009 | Kelley | A01M 23/20 |
| | | | | 43/61 |
| 2015/0272082 | A1 | 10/2015 | Miller | |

\* cited by examiner

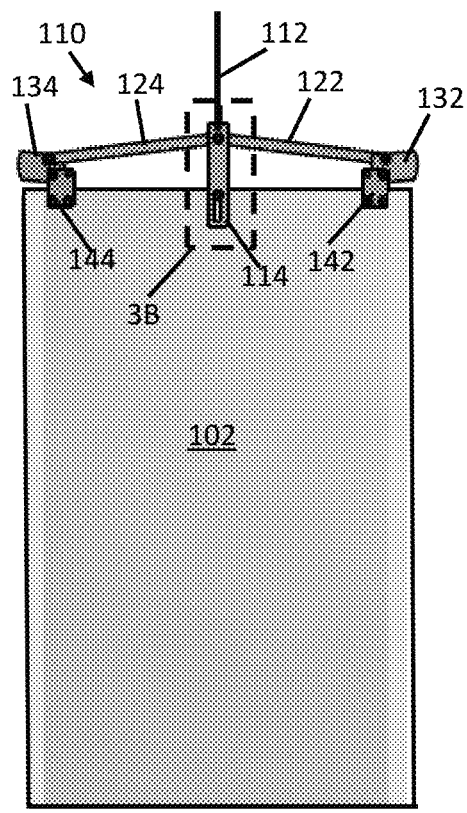
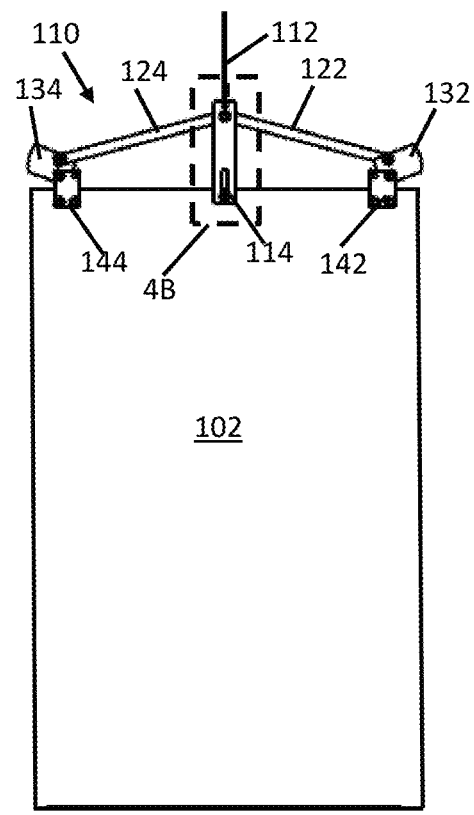
Figure 3A
Figure 4A
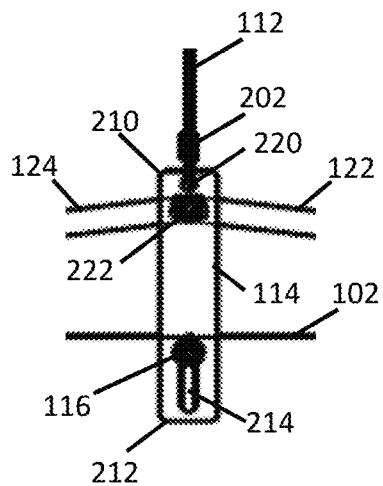
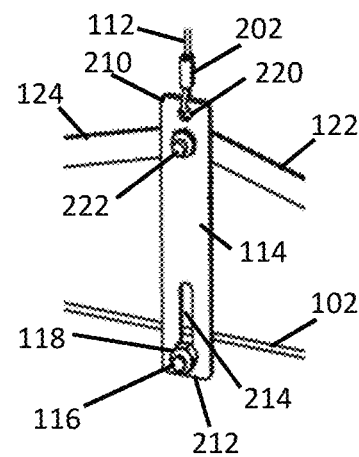
Figure 3B
Figure 4B

SELF-LOCKING GUILLOTINE DOOR

FIELD OF THE DISCLOSURE

The present disclosure relates to animal enclosures, and more specifically to a self-locking door for an animal enclosure.

BACKGROUND

Animal enclosures such as cages are generally intended to keep multiple animals enclosed as safely and effectively as possible. In many environments, such as kennels and animal boarding environments, multiple animal enclosures may be organized next to each other (e.g., configured in rows). It is usually desirable to periodically let an animal out of its enclosure to play or exercise in a larger common area that may be accessible by multiple animal enclosures. It is also desirable to control which animal or animals can have access to the common area at any one time. For example, there may be two animals that socialize well and can access the common area at the same time but a third animal that does not socialize well with the other two. It would be desirable to allow one or both of the animals that socialize well to have access to the common area during one time period, while the third animal is kept in its enclosure; and only allow the third animal to have access to the common area when the other two animals are in their enclosures. Enclosure doors can be opened and closed to allow and block access between the individual enclosures and the common area.

For various reasons, it may also be desirable to open and close the enclosure doors without exposing the caregiver to the animal. Thus it would be desirable to open and close the enclosure doors without having to be in the enclosure or in the common area that are connected through the enclosure door.

At times, and animal may try to lift a partially or fully closed enclosure door, or try to block an enclosure door while it is closing and lift the enclosure door using its paws or snout. It would be desirable to have the enclosure door resist lifting of the enclosure door from the bottom by an animal while still allowing opening and closing of the enclosure door by the caregiver. This can be very important for a facility that handles aggressive animals.

In addition, many kennels are laid out with two runs connected by a common door. During low-volume periods the common door can be raised and one animal can have access to both runs. Sometimes however, the shelters need to put an animal in both runs and close the common door in order to meet capacity. These can be critical situations because some animals, for example dogs, can be aggressive and try to get at the neighboring animal by lifting up the common door. The same is true in pet resorts: in low-volume periods one animal can be given access to both runs but during peak demand the common door can be closed in order to create two runs.

The self-locking enclosure door disclosed herein can enable a caregiver to open and close enclosure doors without having to be in the enclosure or in an area that the animal has access to through the enclosure door, and can also resist lifting of the enclosure door from the bottom by the animal.

SUMMARY

A self-locking guillotine door assembly for an animal enclosure is disclosed. The guillotine door assembly includes an enclosure door, a locking mechanism, and a cable. The enclosure door is moveable vertically in right and left door tracks. The locking mechanism is attached to the enclosure door, and the cable is attached to the locking mechanism. When the cable is pulled, the cable releases the locking mechanism and lifts the locking mechanism and the enclosure door. However, when the enclosure door is pushed up from the bottom, the locking mechanism locks and resists lifting of the enclosure door.

The locking mechanism can include a slide post and a vertical slide. The slide post can be attached to the enclosure door near or at the top of the enclosure door. The vertical slide can have a cable connector and a slot, where the cable is attached to the cable connector. The slide post extends through the slot, and the slot allows the vertical slide to move vertically along the slide post. When the cable is pulled, the cable lifts the vertical slide to release the locking mechanism and lift the locking mechanism and the enclosure door.

The locking mechanism can also include right and left connector bars. The right connector bar can have a proximal end and a distal end, where the proximal end is hingedly attached to the vertical slide and the distal end is coupled to the enclosure door near a right side of the enclosure door. The left connector bar can have a proximal end and a distal end, where the proximal end is hingedly attached to the vertical slide and the distal end is coupled to the enclosure door near a left side of the enclosure door. When the cable is pulled, the cable lifts the vertical slide to lift the proximal ends of the right and left connector bars to release the locking mechanism.

The locking mechanism can also include right and left cams. The distal end of the right connector bar is attached to the right cam and the right cam is also coupled to the enclosure door near the right side of the enclosure door. The right connector bar is attached to the enclosure door through the right cam. The distal end of the left connector bar is attached to the left cam and the left cam is also coupled to the enclosure door near the left side of the enclosure door. The left connector bar is attached to the enclosure door through the left cam. When the cable is pulled, the cable lifts the vertical slide to lift the proximal ends of the right and left connector bars, such that the right connector bar pivots the right cam and the left connector bar pivots the left cam to release the locking mechanism. The right cam can include an upper connection and a lower connection, where the distal end of the right connector bar is attached to the right cam at the upper connection and the right cam is coupled to the enclosure door through the lower connection. The left cam can include an upper connection and a lower connection, where the distal end of the left connector bar is attached to the left cam at the upper connection and the left cam is coupled to the enclosure door through the lower connection. When the cable is pulled, the cable lifts the vertical slide to lift the proximal ends of the right and left connector bars, such that the right connector bar pivots the right cam in a counterclockwise direction and the left connector bar pivots the left cam in a clockwise direction to release the locking mechanism.

The locking mechanism can also include right and left support brackets. The right support bracket can be connected to the enclosure door near the right side of the enclosure door, where the right cam is connected to the right support bracket at the lower connection of the right cam and the right cam is coupled to the enclosure door through the right support bracket. The left support bracket can be connected to the enclosure door near the left side of the enclosure door, where the left cam is connected to the left support bracket at the lower connection of the left cam and the left cam is coupled to the enclosure door through the left support bracket.

The right cam can have a proximal side and a distal side, where the upper and lower connections of the right cam are on the proximal side and the distal side is adjacent to the right door track. The left cam can have a proximal side and a distal side, where the upper and lower connections of the left cam are on the proximal side and the distal side is adjacent to the left door track. When the cable is pulled, the cable lifts the vertical slide to lift the proximal ends of the right and left connector bars, such that the right connector bar pulls the upper connection of the right cam towards the vertical slide which pivots the right cam in a counterclockwise direction and pulls the distal end of the right cam away from the enclosure door, and the left connector bar pulls the upper connection of the left cam towards the vertical slide which pivots the left cam in a clockwise direction and pulls the distal end of the left cam away from the enclosure door, to release the locking mechanism.

The right support bracket can be at or near the top of the enclosure door, and the lower connection of the right cam to the right support bracket can separate the right cam from the top of the enclosure door. The left support bracket can be at or near the top of the enclosure door, and the lower connection of the left cam to the left support bracket can separate the left cam from the top of the enclosure door. When the cable is pulled, the cable pivots the distal ends of the right and left cams away from the top of the enclosure door to release the locking mechanism and allow lifting of the enclosure door. When the enclosure door is pushed up from the bottom, the locking mechanism pivots the distal ends of the right and left cams towards the top of the enclosure door to lock the locking mechanism and resist lifting of the enclosure door.

The slot of the vertical slide can have a slot top and a slot bottom. When the cable is pulled, the cable pulls the slot bottom against the slide post as it releases the locking mechanism and allows lifting of the enclosure door. When the enclosure door is pushed up from the bottom, the enclosure door pushes the slide post against the slot top and the locking mechanism resists lifting of the enclosure door.

The self-locking guillotine door assembly can also include a handle and a pulley. A first end of the cable can be connected to the handle and a second end of the cable can be connected to the vertical slide. The cable run over the pulley which is located between the handle and the vertical slide. The handle can be pulled to pull the cable and release the locking mechanism.

An animal enclosure with a self-locking guillotine door assembly is disclosed, where the animal enclosure includes a plurality of walls, right and a left door tracks, a guillotine door, a locking mechanism, and a cable. The plurality of walls includes a door wall, where the plurality of walls separates an enclosure interior from an enclosure exterior. The right and left door tracks are on the door wall. The guillotine door is moveable vertically in the right and left door tracks. The locking mechanism is attached to the guillotine door, and the cable is attached to the locking mechanism. When the cable is pulled, the cable releases the locking mechanism and lifts the locking mechanism and the guillotine door to allow access between the enclosure interior and exterior through the guillotine door. However, when the guillotine door is pushed up from the bottom, the locking mechanism locks and resists lifting of the guillotine door.

A self-locking enclosure door method for an animal enclosure is disclosed. The method includes pulling a cable coupled to an enclosure door; lifting a vertical slide by the pulling of the cable; lifting a slot of the vertical slide along a slide post until the slide post reaches a bottom of the slot by the lifting of the vertical slide (the slide post is connected to the enclosure door); releasing a locking mechanism by the lifting of the slot of the vertical slide; and engaging the locking mechanism by pushing up on the bottom of the enclosure door.

The self-locking enclosure door method can also include lifting proximal ends of right and left connector bars by the lifting of the slot of the vertical slide. The right connector bar has the proximal end and a distal end, where the proximal end is hingedly attached to the vertical slide and the distal end is coupled to the enclosure door near a right side of the enclosure door. The left connector bar has the proximal end and a distal end, where the proximal end is hingedly attached to the vertical slide and the distal end is coupled to the enclosure door near a left side of the enclosure door.

The self-locking enclosure door method can also include pivoting a right cam counterclockwise by the lifting of the proximal end of the right connector bar, and pivoting a left cam clockwise by the lifting of the proximal end of the left connector bar. The distal end of the right connector bar is attached to the right cam and the right cam is connected to the enclosure door near the right side of the enclosure door. The distal end of the left connector bar is attached to the left cam and the left cam is connected to the enclosure door near the left side of the enclosure door.

The self-locking enclosure door method can also include releasing the locking mechanism by the lifting of the slot of the vertical slide, the pivoting of the right cam counterclockwise away from the enclosure door, and the pivoting of the left cam clockwise away from the enclosure door. The self-locking enclosure door method can also include engaging the locking mechanism by the pushing up on the bottom of the enclosure door, pivoting of the right cam clockwise against the enclosure door, and pivoting of the left cam counterclockwise against the enclosure door.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3A illustrates the guillotine door assembly with the locking mechanism in a locked position;

FIG. 3B illustrates an enlarged view of the area 3B outlined in FIG. 3A;

FIG. 4A illustrates the guillotine door assembly with the locking mechanism in an unlocked position;

FIG. 4B illustrates an enlarged view of the area 4B outlined in FIG. 4A;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
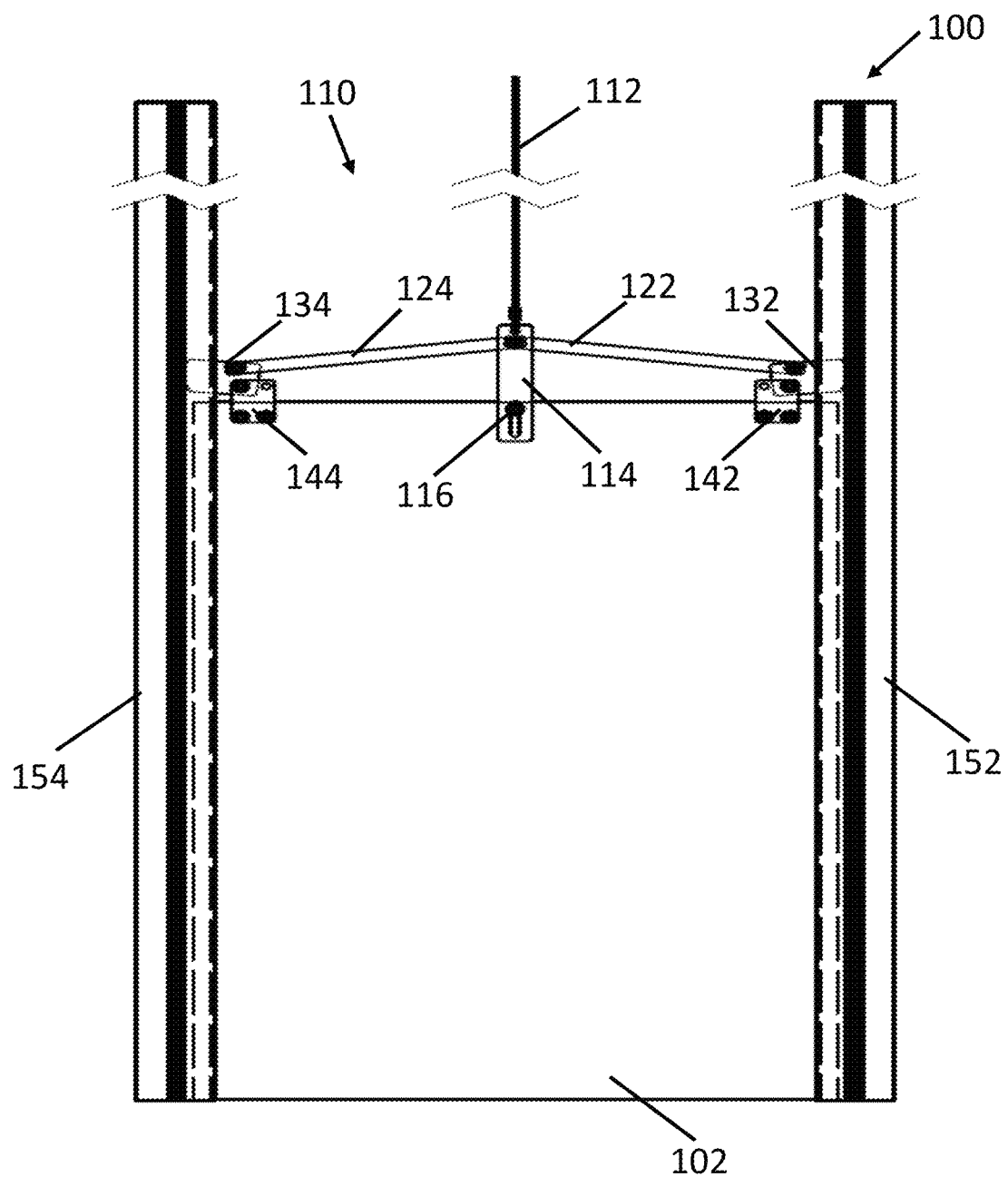
FIG. 1 illustrates an exemplary embodiment of a self-locking guillotine door assembly with a locking mechanism.
Figure 2:
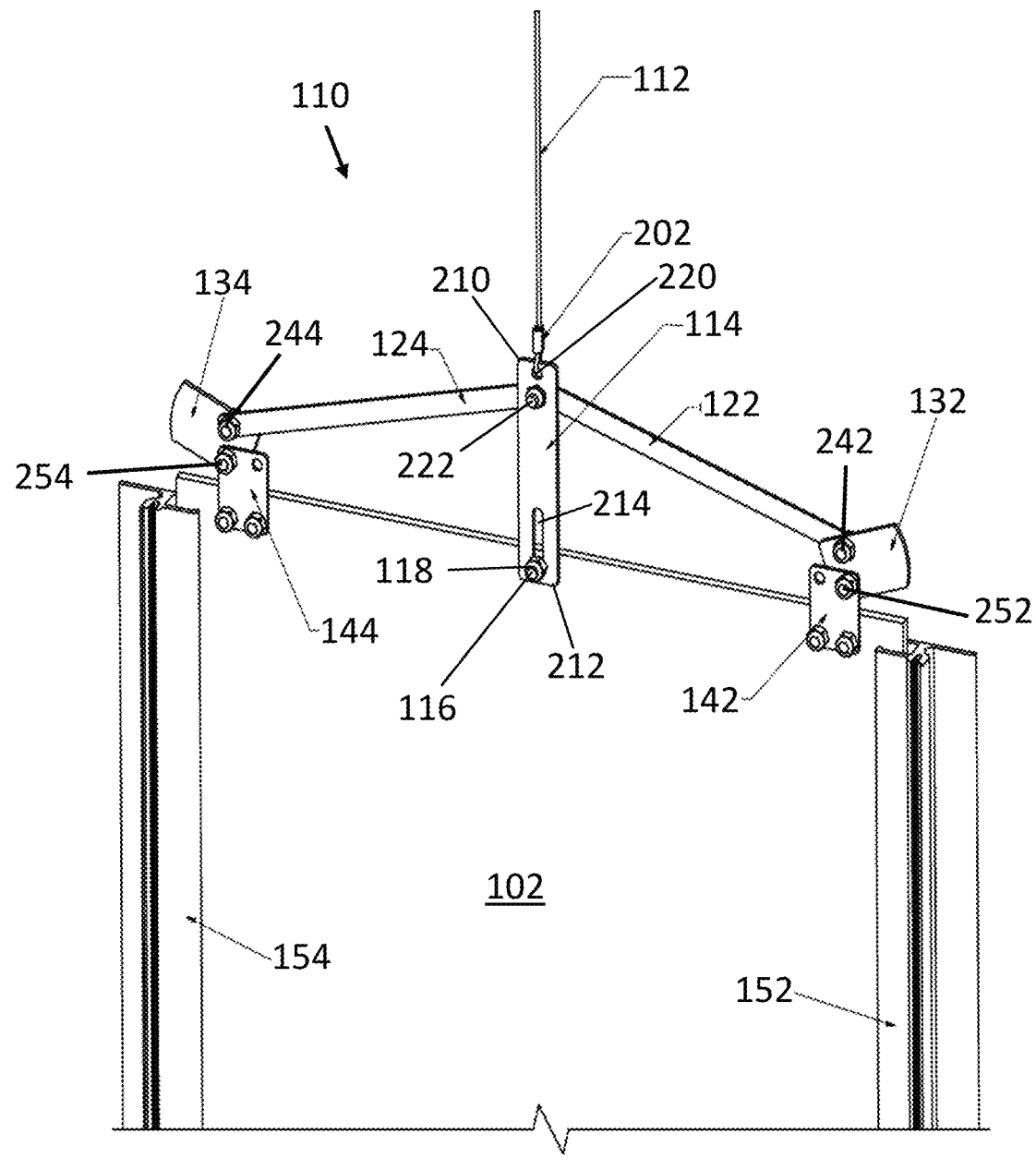
FIG. 2 illustrates an enlarged view of the locking mechanism outside of the door tracks.
Figure 5:
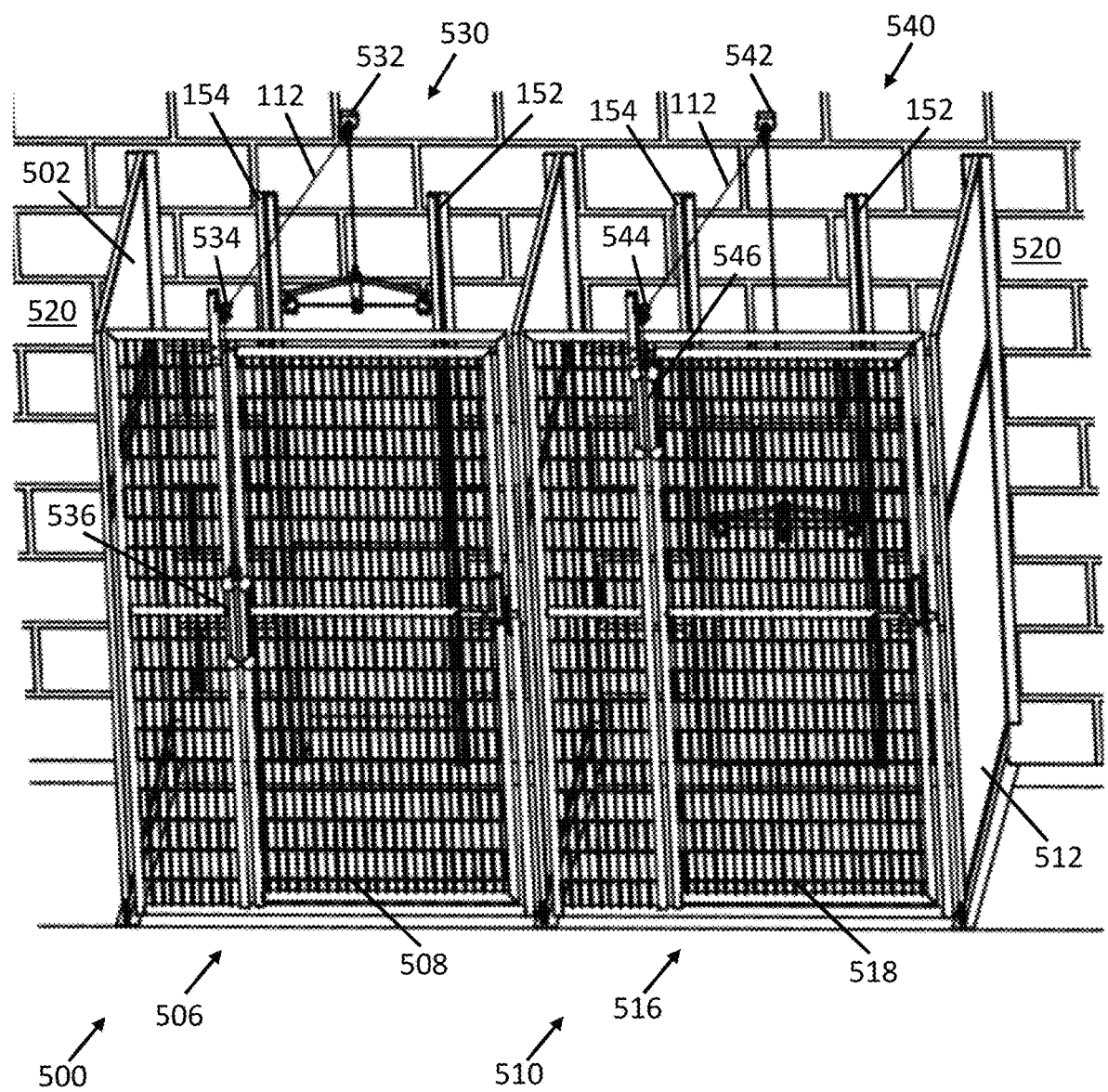
FIG. 5 illustrates an exemplary pair of animal enclosures that each include a guillotine door assembly on a rear wall.
Figure 6:
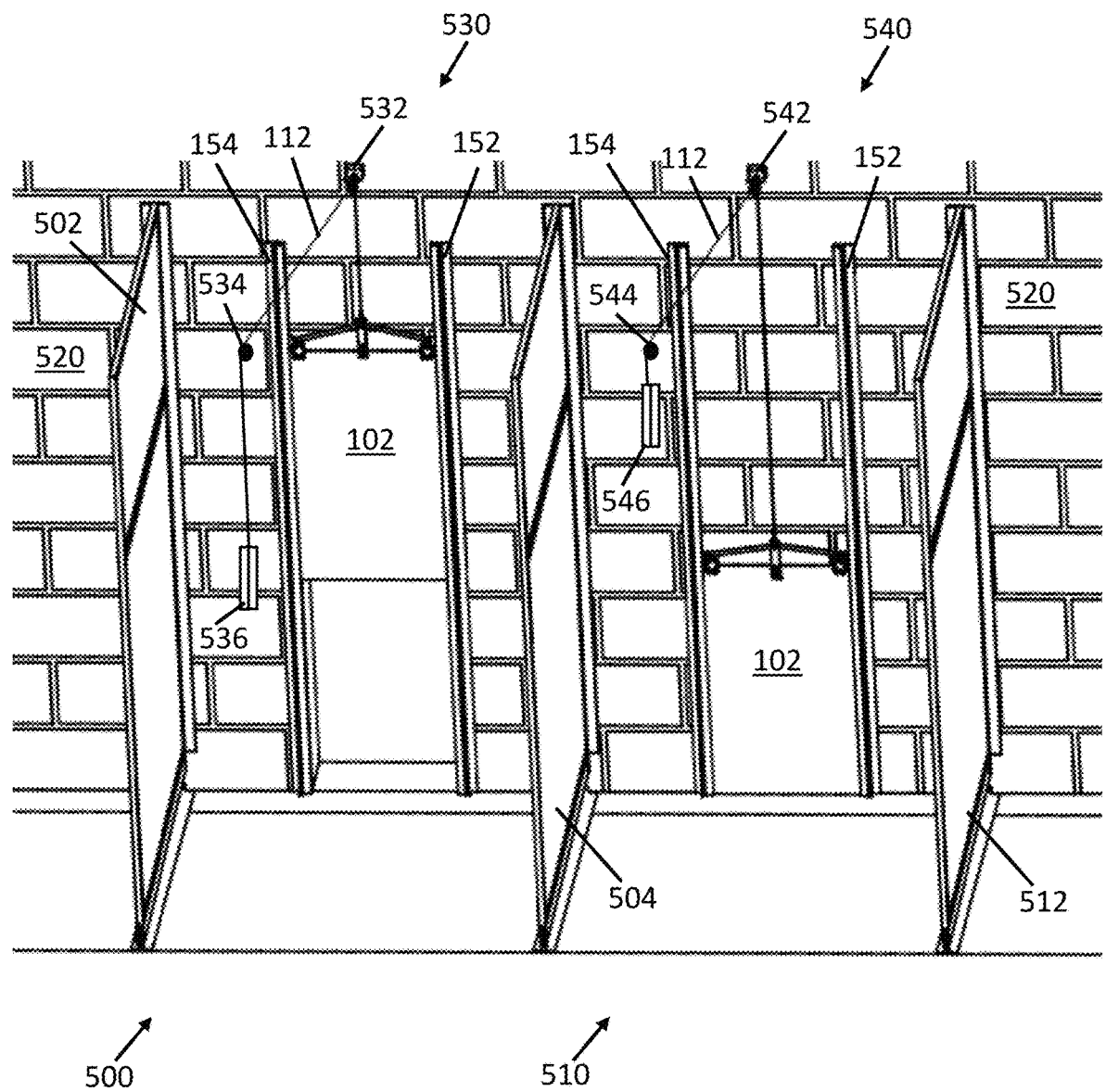
FIG. 6 illustrates the exemplary pair of animal enclosures of FIG. 5 with the front walls removed to more clearly show the guillotine door assemblies on the rear wall.

FIG. 1 illustrates an exemplary embodiment of a self-locking guillotine door assembly 100 with a locking mechanism 110 that can lock in door tracks 152, 154. FIG. 2 illustrates an enlarged view of the locking mechanism 110 outside of the door tracks 152, 154. FIG. 3A illustrates the guillotine door assembly 100 with the locking mechanism 110 in a locked position, and FIG. 3B illustrates an enlarged view of the area 3B outlined in FIG. 3A. FIG. 4A illustrates the guillotine door assembly 100 with the locking mechanism 110 in an unlocked position, and FIG. 4B illustrates an enlarged view of the area 4B outlined in FIG. 4A. FIGS. 3A and 4A do not show the door tracks 152, 154 to more clearly show the positions of the components of the locking mechanism 110. FIG. 5 illustrates an exemplary pair of animal enclosures 500, 510 with rear wall 520, side walls 502, 504, 512 and front walls 506, 516 that each include a guillotine door assembly 530, 540 on the rear wall 520. FIG. 6 illustrates the exemplary pair of animal enclosures 500, 510 with the front walls 506, 516 removed to more clearly show the guillotine door assemblies 530, 540 on the rear wall 520.

An exemplary embodiment of a guillotine door assembly 100 includes a door 102 and a locking mechanism 110 that travel up and down in door tracks 152, 154. The locking mechanism 110 includes a cable 112, a vertical slide 114, a slide post 116, right and left connector bars 122, 124, right and left cams 132, 134 and right and left support brackets 142, 144.

The vertical slide 114 has an upper end 210, a lower end 212 and a slot 214. The vertical slide 114 also includes a cable connector 220 and a bar connector 222. The cable 112 is connected to the cable connector 220 which can be located near the upper end 210 of the vertical slide 114. The cable 112 can be a cable, wire, chain, rope or other similar device for pulling the vertical slide 114. The cable connector 220 can be a hole in the vertical slide 214, the cable 112 can be threaded through the cable connector 220 and a ferrule 202 can be crimped on the cable to hold the cable 112 in the cable connector 220. Other known methods of securing a cable to a connector can be used, for example soldering, riveting, chain-link, etc. The connector bars 122, 124 are hingedly connected to the bar connector 222 which can be located between the cable connector 220 and the slot 214 of the vertical slide 114. A bolt can be used to connect the connector bars 122, 124 to the vertical slide 114 at the bar connector 222. The bar connector 222 can have separate connections for the right and left connector bars 122, 124. The slide post 116 is connected to the door 102 near the top of the door 102, and near the middle of the door 102 between the door tracks 152, 154. The slide post 116 is positioned in the slot 214 of the vertical slide 114 such that the slot 214 can slide along the slide post 116. The slide post 116 can have an enlarged end 118 and the vertical slide 114 can be captured on the slide post 116 between the door 102 and the enlarged end 118.

The door tracks 152, 154; the connector bars 122, 124; the cams 132, 134 and the support brackets 142, 144 each have right and left elements that are generally mirror images of each other. The door 102 slides up and down in the right and left door tracks 152, 154. The right and left support brackets 142, 144 are connected to the door 102 at or near the top of the door 102, with the slide post 116 between the right and left support brackets 142, 144. The right support bracket 142 is connected to the door 102 near the right door track 152, and the left support bracket 144 is connected to the door 102 near the left door track 154. The right and left connector bars 122, 124 each have a proximal end hingedly connected to the bar connector 222 of the vertical slide 114, and a distal end hingedly connected to the right and left cams 132, 134, respectively.

The right and left cams 132, 134 each have a proximal end nearer the vertical slide 114, and a distal end nearer the right and left door track 152, 154, respectively. The right cam 132 has an upper connection 242 and a lower connection 252 near the proximal end. The right cam 132 is hingedly connected to the right connector bar 122 at the upper connection 242, and the right cam 132 is hingedly connected to the right support bracket 142 at the lower connection 252. The left cam 134 has an upper connection 244 and a lower connection 254 near the proximal end. The left cam 134 is hingedly connected to the left connector bar 124 at the upper connection 244, and the left cam 134 is hingedly connected to the left support bracket 144 at the lower connection 254. The lower connection 252 between the right support bracket 142 and the right cam 132 can separate the bottom of the right cam 132 from the top of the door 102 such that pushing up on the door 102 tends to pivot the distal end of the right cam 132 in a clockwise direction about the lower connection 252 to push the distal end of the right cam 132 against the top of the door 102 and the right door track 152. Similarly, the lower connection 254 between the left support bracket 144 and the left cam 134 can separate the bottom of the left cam 134 from the top of the door 102 such that pushing up on the door 102 tends to pivot the distal end of the left cam 134 in a counter-clockwise direction about the lower connection 254 to push the distal end of the left cam 134 against the top of the door 102 and the left door track 154.

The door 102 can be raised and lowered in the right and left door tracks 152, 154 using the cable 112. Pulling the cable 112 lifts the vertical slide 114 along the slide post 116 until the bottom of the slot 214 hits the slide post 116 on the door 102. As the vertical slide 114 raises, it raises the proximal ends of the right and left connector bars 122, 124 which pulls the upper connection 242 of the right cam 132 towards the center of the door 102 and pulls the upper connection 244 of the left cam 134 towards the center of the door 102. Pulling the upper connection 242 of the right cam 132 towards the center of the door 102 pivots the distal end of the right cam 132 in a counterclockwise direction about the lower connection 252 which pulls the distal end of the right cam 132 away from the top of the door 102. Pulling the upper connection 244 of the left cam 134 towards the center of the door 102 pivots the distal end of the left cam 142 in a clockwise direction about the lower connection 254 which pulls the distal end of the left cam 134 away from the top of the door 102. With the right cam 132 pivoted away from the door 102 and from the right door track 152, and with the left cam 134 pivoted away from the door 102 and from the left door track 154, continued pulling of the cable 112 continues to lift the vertical slide 114 which lifts the slide post 116 and the door 102.

The door 102 resists being raised in the right and left door tracks 152, 154 when being pushed up from the bottom of the door 102. Pushing up on the bottom of the door 102 pushes up the slide post 116 and the right and left support brackets 142, 144. Pushing up the slide post 116 pushes up on the top of the slot 214 of the vertical slide 114 which pushes out on the right connector bar 122 against the upper connection 242 of the right cam 132 towards the right door track 152, and pushes out on the left connector bar 124 against the upper connection 244 of the left cam 134 towards the left door track 154. Pushing the right support bracket 142 pushes up the lower connection 252 of the right cam 132, which together with the outward pushing of the right connector bar 122 against the upper connection 242 of the right cam 132, pivots the distal end of the right cam 132 in a clockwise direction about the lower connection 252 towards the top of the door 102 and the right door track 152. Pushing the left support bracket 144 pushes up the lower connection 254 of the left cam 134, which together with the outward pushing of the left connector bar 124 against the upper connection 244 of the left cam 134, pivots the distal end of the left cam 134 in a counterclockwise direction about the lower connection 254 towards the top of the door 102 and the left door track 154. Continued pushing up on the bottom of the door 102 binds the distal end of the right cam 132 between the top of the door 102 and the right door track 152 and binds the distal end of the left cam 134 between the top of the door 102 and the left door track 154 which resists or prevents further lifting of the door 102.

FIG. 5 illustrates an exemplary pair of animal enclosures 500, 510 that each include a guillotine door assembly 530, 540 on a rear wall 520. The first animal enclosure 500 includes a left side wall 502, a shared central sidewall 504, a front wall 506 and the rear wall 520 with a first guillotine door assembly 530 mounted on the rear wall 520. The second animal enclosure 510 includes the shared central sidewall 504, a right sidewall 512, a front wall 516 and the rear wall 520 with a second guillotine door assembly 540 mounted on the rear wall 520. The front wall 506 of the first animal enclosure 500 includes a front gate 508, and the front wall 516 of the second animal enclosure 510 includes a front gate 518. FIG. 6 illustrates the exemplary pair of animal enclosures 500, 510 with the front walls 506, 516 removed to more clearly show the guillotine door assemblies 530, 540 on the rear wall 520. The right and left door tracks 152, 154 of the guillotine door assemblies 530, 540 are mounted on the rear wall 520.

The first animal enclosure 500 further includes a rear pulley 532 mounted on the rear wall 520 and a front pulley 534 mounted on the front wall 506. The cable 112 of the first guillotine door assembly 530 runs from a first end connected to the vertical slide 114 of the first guillotine door assembly 530 over the rear pulley 532 and the front pulley 534 to a second end connected to a first handle 536. FIGS. 5 and 6 show the first handle 536 pulled down which pulls up the door 102 of the first guillotine door assembly 530 into an open position allowing access to the interior of the first animal enclosure 500 through the first guillotine door assembly 530. The front wall 506 of the first animal enclosure 500 can include one or more hooks or other fastening mechanisms to hold the first handle 536 and/or the cable 112 at a desired position to maintain the door 102 of the first guillotine door assembly 530 in a desired position.

The second animal enclosure 510 further includes a rear pulley 542 mounted on the rear wall 520 and a front pulley 544 mounted on the front wall 516. The cable 112 of the second guillotine door assembly 540 runs from a first end connected to the vertical slide 114 of the second guillotine door assembly 540 over the rear pulley 542 and the front pulley 544 to a second end connected to a second handle 546. FIGS. 5 and 6 show the second handle 546 in an up position which allows the door 102 of the second guillotine door assembly 540 to close and rest on the floor of the second animal enclosure 510 which blocks access to the interior of the second animal enclosure 510 through the second guillotine door assembly 540. The front wall 516 of the second animal enclosure 510 can include one or more hooks or other fastening mechanisms to hold the second handle 546 and/or the cable 112 at a desired position to maintain the door 102 of the second guillotine door assembly 540 in a desired position. A fastening mechanism is not necessary to hold the second handle 546 to keep the door 102 of the second guillotine door assembly 540 closed, but a mechanism may be used to prevent the handle 546 from lifting above a top position where the door 102 is fully closed.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A self-locking guillotine door assembly for an animal enclosure, the guillotine door assembly comprising:
   an enclosure door moveable vertically in right and left door tracks;
   a locking mechanism attached to the enclosure door;
   a cable extending from a first end to a second end, wherein the first end is attached to the locking mechanism, wherein the second end is attached to a handle;
   wherein when the handle is manually pulled, the cable releases the locking mechanism and lifts the locking mechanism and the enclosure door; and
   wherein when the enclosure is pushed up from the bottom, the locking mechanism locks in response to the pushing up of the enclosure door from the bottom by causing at least a portion of the locking mechanism to move horizontally into binding engagement and thereby resists lifting of the enclosure door.

2. The self-locking guillotine door assembly of claim 1, wherein the locking mechanism comprises:
   a slide post attached to the enclosure door near or at the top of the enclosure door; and
   a vertical slide having a cable connector and a slot, where the cable is attached to the cable connector, the slide post extends through the slot, and the slot allows the vertical slide to move vertically along the slide post;
   wherein when the handle is manually pulled, the cable lifts the vertical slide to release the locking mechanism and lift the locking mechanism and the enclosure door.

3. The self-locking guillotine door assembly of claim 2, wherein the locking mechanism further comprises:
   a right connector bar having a proximal end and a distal end, where the proximal end is hingedly attached to the vertical slide and the distal end is coupled to the enclosure door near a right side of the enclosure door; and a left connector bar having a proximal end and a distal end, where the proximal end is hingedly attached to the vertical slide and the distal end is coupled to the enclosure door near a left side of the enclosure door;

wherein when the handle is manually pulled, the cable lifts the vertical slide to lift the proximal ends of the right and left connector bars to release the locking mechanism.

4. The self-locking guillotine door assembly of claim 3, wherein the locking mechanism further comprises:

a right cam, where the distal end of the right connector bar is attached to the right cam and the right cam is also coupled to the enclosure door near the right side of the enclosure door, the right connector bar being attached to the enclosure door through the right cam; and a left cam, where the distal end of the left connector bar is attached to the left cam and the left cam is also coupled to the enclosure door near the left side of the enclosure door, the left connector bar being attached to the enclosure door through the left cam;

wherein when the handle is manually pulled, the cable lifts the vertical slide to lift the proximal ends of the right and left connector bars, such that the right connector bar pivots the right cam and the left connector bar pivots the left cam to release the locking mechanism.

5. The self-locking guillotine door assembly of claim 4, wherein:

the right cam includes an upper connection and a lower connection, the distal end of the right connector bar is attached to the right cam at the upper connection and the right cam is coupled to the enclosure door through the lower connection;

the left cam includes an upper connection and a lower connection, the distal end of the left connector bar is attached to the left cam at the upper connection and the left cam is coupled to the enclosure door through the lower connection;

when the handle is manually pulled, the cable lifts the vertical slide to lift the proximal ends of the right and left connector bars, such that the right connector bar pivots the right cam in a counterclockwise direction and the left connector bar pivots the left cam in a clockwise direction to release the locking mechanism.

6. The self-locking guillotine door assembly of claim 5, wherein the locking mechanism further comprises:

a right support bracket connected to the enclosure door near the right side of the enclosure door, where the right cam is connected to the right support bracket at the lower connection of the right cam and the right cam is coupled to the enclosure door through the right support bracket;

a left support bracket connected to the enclosure door near the left side of the enclosure door, where the left cam is connected to the left support bracket at the lower connection of the left cam and the left cam is coupled to the enclosure door through the left support bracket.

7. The self-locking guillotine door assembly of claim 6, wherein:

the right cam has a proximal side and a distal side, where the upper and lower connections of the right cam are on the proximal side and the distal side is adjacent to the right door track; and the left cam has a proximal side and a distal side, where the upper and lower connections of the left cam are on the proximal side and the distal side is adjacent to the left door track;

when the handle is manually pulled, the cable lifts the vertical slide to lift the proximal ends of the right and left connector bars, such that the right connector bar pulls the upper connection of the right cam towards the vertical slide which pivots the right cam in a counter-clockwise direction and pulls the distal end of the right cam away from the enclosure door, and the left connector bar pulls the upper connection of the left cam towards the vertical slide which pivots the left cam in a clockwise direction and pulls the distal end of the left cam away from the enclosure door, to release the locking mechanism.

8. The self-locking guillotine door assembly of claim 7, wherein:

the right support bracket is at or near the top of the enclosure door, and the lower connection of the right cam to the right support bracket separates the right cam from the top of the enclosure door;

the left support bracket is at or near the top of the enclosure door, and the lower connection of the left cam to the left support bracket separates the left cam from the top of the enclosure door; and when the handle is manually pulled, the cable pivots the distal ends of the right and left cams away from the top of the enclosure door to release the locking mechanism and allow lifting of the enclosure door, but when the enclosure door is pushed up from the bottom, the locking mechanism pivots the distal ends of the right and left cams towards the top of the enclosure door to lock the locking mechanism and resist lifting of the enclosure door.

9. The self-locking guillotine door assembly of claim 8, wherein:

the slot of the vertical slide has a slot top and a slot bottom; and when the handle is manually pulled, the cable pulls the slot bottom against the slide post as it releases the locking mechanism and allows lifting of the enclosure door; but when the enclosure door is pushed up from the bottom, the enclosure door pushes the slide post against the slot top and the locking mechanism resists lifting of the enclosure door.

10. The self-locking guillotine door assembly of claim 9, further comprising a pulley that the cable runs over, the pulley located between the handle and the vertical slide, wherein the handle is pulled to pull the cable and release the locking mechanism.

11. An animal enclosure with a self-locking guillotine door assembly, the animal enclosure comprising:

a plurality of walls including a door wall, where the plurality of walls separates an enclosure interior from an enclosure exterior;

a right door track and a left door track on the door wall;

a guillotine door moveable vertically in the right and left door tracks;

a locking mechanism attached to the guillotine door;

a cable having a first end and a second end, wherein the first end is attached to the locking mechanism, wherein the second end is attached to a handle;

wherein when the handle is manually pulled, the cable releases the locking mechanism and lifts the locking mechanism and the guillotine door to allow access between the enclosure interior and exterior through the guillotine door; but when the guillotine door is pushed up from the bottom, the locking mechanism locks in response to the pushing up of the enclosure door from the bottom by causing at least a portion of the locking mechanism to move horizontally into binding engagement with at least one of the right door track or the left door track and thereby resists lifting of the guillotine door.

12. The animal enclosure of claim 11, wherein the locking mechanism comprises:
a slide post attached to the guillotine door near or at the top of the guillotine door; and
a vertical slide having a cable connector and a slot, where the cable is attached to the cable connector, the slide post extends through the slot, and the slot allows the vertical slide to move vertically along the slide post;
wherein when the handle is manually pulled, the cable lifts the vertical slide to release the locking mechanism and lift the locking mechanism and the guillotine door.

13. The animal enclosure of claim 12, wherein the locking mechanism further comprises:
a right connector bar that has a proximal end and a distal end, where the proximal end is attached to the vertical slide;
a right cam that includes an upper connection and a lower connection, where the distal end of the right connector bar is attached to the right cam at the upper connection;
a right support bracket connected to the guillotine door near the right door track, where the right support bracket is connected to the right cam at the lower connection of the right cam;
a left connector bar that has a proximal end and a distal end, where the proximal end is attached to the vertical slide;
a left cam that includes an upper connection and a lower connection, where the distal end of the left connector bar is attached to the left cam at the upper connection;
a left support bracket connected to the guillotine door near the left door track, where the left support bracket is connected to the left cam at the lower connection of the left cam;
wherein when the handle is manually pulled, the cable lifts the vertical slide to lift the proximal ends of the right and left connector bars, such that the right connector bar pivots the right cam in a counterclockwise direction away from the guillotine door and the left connector bar pivots the left cam in a clockwise direction away from the guillotine door to release the locking mechanism.

14. The animal enclosure of claim 13, wherein:
the right cam has a proximal side and a distal side, where the upper and lower connections of the right cam are on the proximal side and the distal side is adjacent to the right door track;
the left cam has a proximal side and a distal side, where the upper and lower connections of the left cam are on the proximal side and the distal side is adjacent to the left door track; and
when the handle is manually pulled, the cable lifts the vertical slide to lift the proximal ends of the right and left connector bars, such that the right connector bar pulls the upper connection of the right cam towards the vertical slide which pivots the right cam in a counterclockwise direction and pivots the distal end of the right cam away from the guillotine door, and the left connector bar pulls the upper connection of the left cam towards the vertical slide which pivots the left cam in a clockwise direction and pivots the distal end of the right cam away from the guillotine door, to release the locking mechanism.

15. The animal enclosure of claim 14, wherein:
the slot of the vertical slide has a slot top and a slot bottom; and
when the handle is manually pulled, the cable pulls the slot bottom against the slide post as it releases the locking mechanism and allows lifting of the guillotine door, but when the guillotine door is pushed up from the bottom, the guillotine door pushes the slide post against the slot top and the locking mechanism resists lifting of the guillotine door.

16. The animal enclosure of claim 15, further comprising a pulley that the cable runs over, the pulley located between the handle and the vertical slide, wherein the handle is pulled to pull the cable and release the locking mechanism.

17. A self-locking enclosure door method for an animal enclosure, the method comprising:
pulling a handle of a cable coupled to an enclosure door having a top and a bottom, wherein the cable is coupled to the enclosure door at a first end of the cable, wherein the handle is disposed at a second end of the cable;
lifting a vertical slide by the pulling of the cable;
lifting a slot of the vertical slide along a slide post until the slide post reaches a bottom of the slot by the lifting of the vertical slide, the slide post being connected to the enclosure door;
releasing a locking mechanism by the lifting of the slot of the vertical slide; and
engaging the locking mechanism by pushing up on the bottom of the enclosure door, wherein at least a portion of the locking mechanism moves horizontally outwardly from the enclosure door in response to the pushing up on the bottom of the enclosure door.

18. The self-locking enclosure door method of claim 17, the method further comprising:
lifting a proximal end of a right connector bar by the lifting of the slot of the vertical slide, the right connector bar having the proximal end and a distal end, where the proximal end is hingedly attached to the vertical slide and the distal end is coupled to the enclosure door near a right side of the enclosure door;
lifting a proximal end of a left connector bar by the lifting of the slot of the vertical slide, the left connector bar having the proximal end and a distal end, where the proximal end is hingedly attached to the vertical slide and the distal end is coupled to the enclosure door near a left side of the enclosure door.

19. The self-locking enclosure door method of claim 18, the method further comprising:
pivoting a right cam counterclockwise by the lifting of the proximal end of the right connector bar, where the distal end of the right connector bar is attached to the right cam and the right cam is connected to the enclosure door near the right side of the enclosure door;
pivoting a left cam clockwise by the lifting of the proximal end of the left connector bar, where the distal end of the left connector bar is attached to the left cam and the left cam is connected to the enclosure door near the left side of the enclosure door.

20. The self-locking enclosure door method of claim 19, the method further comprising:
releasing the locking mechanism by the lifting of the slot of the vertical slide, the pivoting of the right cam counterclockwise away from the enclosure door, and the pivoting of the left cam clockwise away from the enclosure door; and engaging the locking mechanism by the pushing up on the bottom of the enclosure door, pivoting of the right cam clockwise against the enclosure door, and pivoting of the left cam counterclockwise against the enclosure door.

\* \* \* \* \*